United States Patent [19]

Gordon

[11] 4,336,669
[45] Jun. 29, 1982

[54] PLANTING CONTAINER

[76] Inventor: George N. Gordon, 203 Missouri St., San Francisco, Calif. 94107

[21] Appl. No.: 219,844

[22] Filed: Dec. 23, 1980

[51] Int. Cl.³ .............................................. A01G 9/02
[52] U.S. Cl. ........................................ 47/74; 47/66; 47/77; 111/1
[58] Field of Search ............................. 47/66, 73–74, 47/77–78, 84

[56] References Cited

U.S. PATENT DOCUMENTS

| | | | |
|---|---|---|---|
| 2,592,052 | 4/1952 | McKenna, Jr. | 47/58 |
| 3,273,284 | 4/1966 | Anagnostou | 47/74 |
| 3,651,772 | 3/1972 | Garabedian | 47/58 |
| 3,755,962 | 9/1973 | Walters | 47/66 |

FOREIGN PATENT DOCUMENTS 957207 11/1974 Canada .................................. 47/74

Primary Examiner—Robert E. Bagwill
Attorney, Agent, or Firm—Phillips, Moore, Lempio & Majestic

[57] ABSTRACT

This invention provides a container (10) for planting seeds or seedlings either manually, mechanically, or by air drop. The container (10) includes at least one tubular cone (22) formed by fluid hardened by freezing and having a tapered lower end (24), an open upper end (26), and an inner cavity for receiving soil (30) and a seed (80) or seedling (32).

54 Claims, 10 Drawing Figures

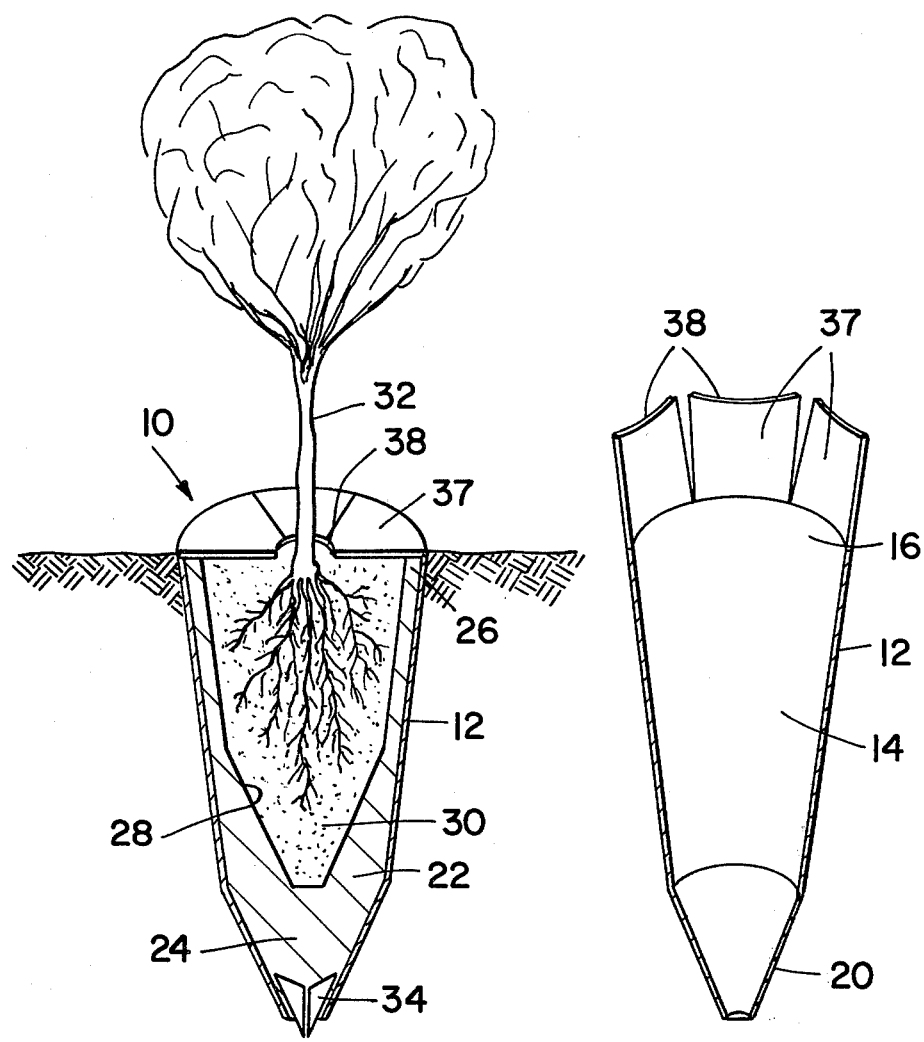
FIG_1  FIG_2
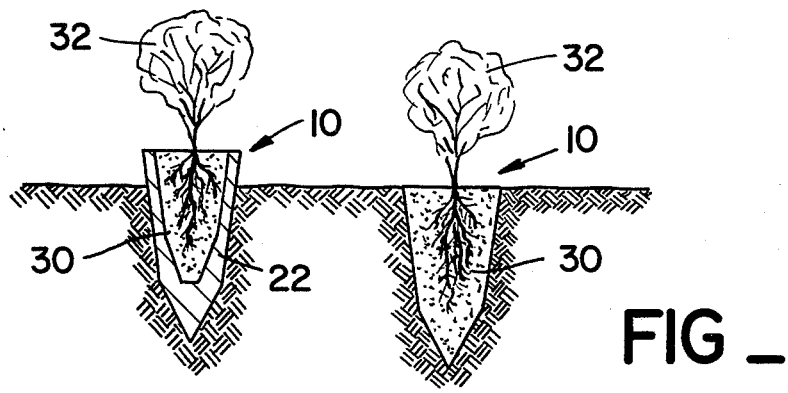
FIG_7

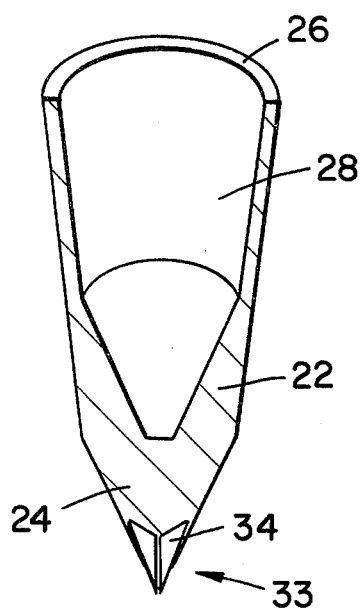
FIG_3
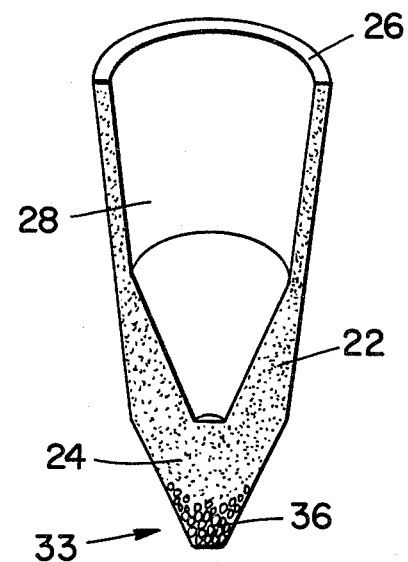
FIG_4
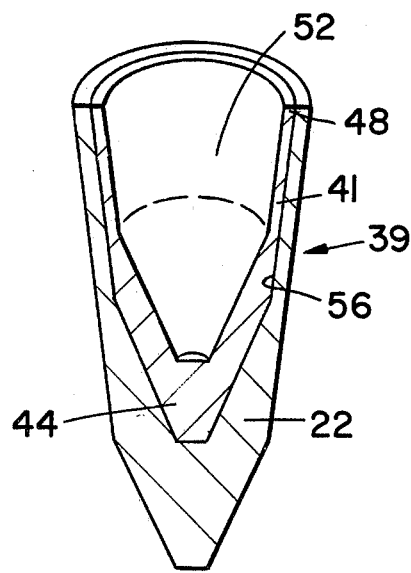
FIG_5
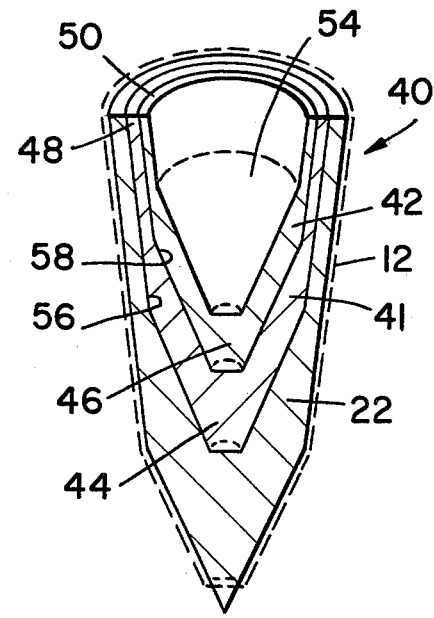
FIG_6

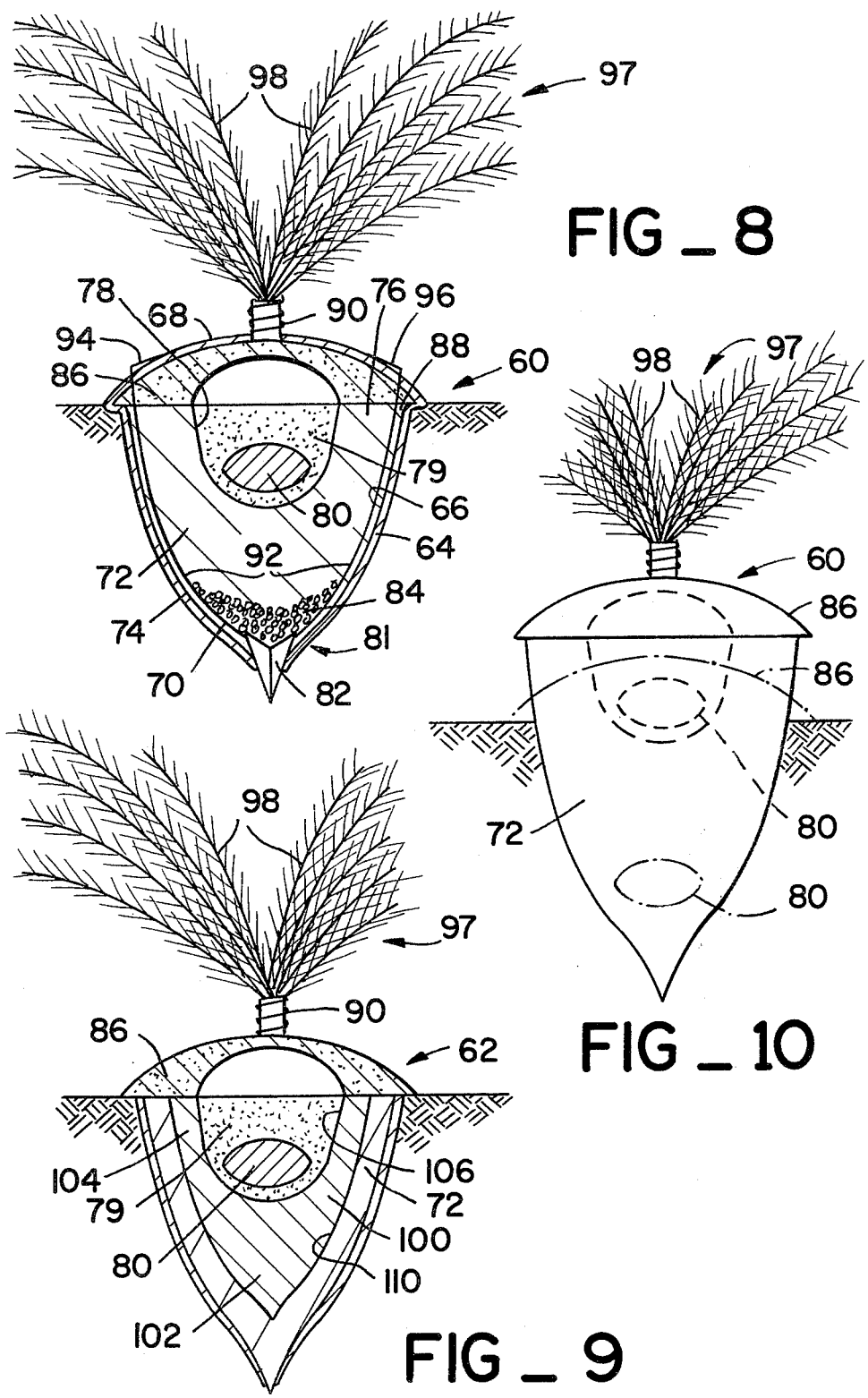

PLANTING CONTAINER

BACKGROUND OF THE INVENTION

This invention relates in general to planting containers and in particular to a planting container for planting seeds or seedlings by a machine or by aerial drop.

Present methods of planting seeds or seedlings involve clearing the land of stubble and growth and plowing the soil into furrows to receive the seeds or seedlings which are planted mechanically by modified agricultural equipment or manually by grub hoes, spades or dibbles. Planting by these conventional methods may be made difficult by the nature of the terrain which may render the planting site inaccessible or difficult to traverse or cultivate.

Several types of containers and methods of planting have been devised for seeding remote or inaccessible areas, for example as in reforesting operations. Exemplary teachings of this kind are disclosed in U.S. Pat. No. 2,592,052 issued to J. C. McKenna, Jr., Apr. 8, 1952 and U.S. Pat. No. 3,651,772 issued to R. V. Garabedian, Mar. 28, 1972 wherein a seed or the roots of a seedling are frozen into a cube or a conically shaped block respectively. The cube or block may be planted manually, mechanically or by air drop. However, the freezing operation disclosed in these references may damage or even kill the seed or the seedling.

U.S. Pat. No. 3,273,284 issued to G. N. Anagnostou, Sept. 20, 1966 and U.S. Pat. No. 3,755,926 issued to J. Walters et al, Sept. 4, 1973 disclose planting containers for the seeding of remote or inaccessible terrain by air drop. While both the references disclose containers possessing sufficient structural strength to protect the seed and seedling and to achieve sufficient penetration of the soil, the relatively heavy mass of the container disclosed by Anagnostou and the use of a nonbiodegradable material for the container, such as plastic as taught by Walters et al, may inhibit the growth of the emplanted root structure. Additionally, the amount of water supplied by the Anagnostou container is relatively limited due to the size limitations of the water pocket formed therein. Furthermore, the container disclosed by Walters et al has no provision for a self contained water supply at all, but rather must depend upon an external source of moisture for watering the seedling.

The foregoing illustrates limitations of the known prior art. In view thereof, it would be advantageous to provide an alternative to the prior art.

DISCLOSURE OF THE INVENTION

In one aspect of the present invention this is accomplished by providing a planting container for planting by machine or by air drop including at least one tubular cone formed by fluid hardened by freezing and having an inner cavity for receiving soil and a seed or seedling.

In another aspect of the present invention there is provided a planting container including an outer tubular cone and one or more inner tubular cones formed from fluid hardened by freezing and adapted to receive soil and a seed or seedling. The hardened fluid may include water or a preselected mixture of water, nutrients and fertilizer.

The foregoing and other aspects will become apparent from the following detailed description of the invention when considered in conjunction with the accompanying drawings. It is to be expressly understood, however, that the drawings are not intended as a definition of the invention but are for the purpose of illustration only.

BRIEF DESCRIPTION OF THE DRAWINGS

In the drawings:

FIG. 1 is a side elevational view of a planting container embodying the present invention and having a seedling contained therein;

FIG. 2 is a vertical sectional view of the outer paper cone of the planting container of FIG. 1;

FIG. 3 is a vertical sectional view of one embodiment of the outer frozen cone of the planting container of FIG. 1;

FIG. 4 is a vertical sectional view of an alternate embodiment of the outer frozen cone of FIG. 3;

FIG. 5 is a vertical sectional view of an outer frozen cone of the planting container of the present invention having a second frozen cone disposed therein;

FIG. 6 is a vertical sectional view of the outer frozen cones of FIG. 5 having a third frozen cone disposed therein;

FIG. 7 is a vertical sectional view of an embodiment of the planting container of the present invention embedded in the ground, illustrating the position of the seedling before and after melting of the tubular cone;

FIG. 8 is a vertical sectional view of an alternate embodiment of the planting container of the present invention;

FIG. 9 is a vertical sectional view of a second alternate embodiment of the planting container of the present invention; and FIG. 10 is a vertical sectional view of the planting container of FIG. 8 embedded in the ground, illustrating the position of the seedling before and after melting of the tubular cone.

BEST MODE FOR CARRYING OUT THE INVENTION

Referring to FIGS. 1 and 2, an embodiment of a planting container constructed according to the present invention is illustrated generally by the numeral 10. The container includes an outer tubular receptacle 12 (FIG. 2) formed of a biodegradable material, for example paper. In addition, the receptacle may be formed from a biodegradable pulp-like material such as used in nursery planting pots. The receptacle has a generally elongated shape defining a chamber 14, an open upper end 16, and a tapered lower end 20.

A tubular cone 22 having a tapered lower end 24, an open upper end 26 and an inner cavity 28 (for receiving soil 30 and a seedling 32) is received in the chamber 14 of the outer paper receptacle 12. The tubular cone is formed from a fluid hardened by freezing, the fluid comprising, for example, water or a preselected mixture of water, nutrients and fertilizer, depending upon the type of seed or seedling and the location of the planting site.

Referring to FIGS. 3 and 4, the tubular cone may include ballast means 33 for maintaining vertical alignment of the planting container during air drop, the ballast means being frozen into the tapered lower end. The ballast means may be in the form of a split arrow tip 34 shown in the embodiment of FIG. 3 which also, upon impact, will split and separate in opposite directions, thereby forming an opening in the end of the outer paper cone for the tap root of the seedling. Alternatively, as shown in FIG. 4, the ballast means may be in the form of iron pellets or shavings 36 frozen into the tapered lower end of the cone.

Referring again to FIGS. 1 and 2, closure means, for example a plurality of flaps or tabs 37 are secured to the open end 16 of the receptacle 12 for closing the open ends of the receptacle and frozen cone 22 and for locking them together. The tabs are foldable over the open ends of the receptacle and the frozen cone and the contents thereof, each tab including an upper arcuate end 38 for forming an aperture around the seedling 32.

Referring now to FIGS. 5 and 6, alternate embodiments 39 and 40 of the planting container 10 of the present invention are illustrated including a second 41 and a third 42 tubular cone respectively. Each of the additional tubular cones includes respectively a tapered lower end 44 and 46, an open upper end 48 and 50, and an inner cavity 52 and 54 for receiving soil and a seed or seedling, or, alternatively, another tubular cone. The additional cone are each formed from fluid hardened by freezing. The fluid preferably comprises water or a preselected mixture of water, nutrients, and fertilizer depending upon the type of seed or seedling and the location of the planting site. In addition, the cones may be separated from one another by a second tubular receptacle 56 disposed intermediate the first and second cones and a third tubular receptacle 58 disposed intermediate the second and third cones respectively. As herein before described with reference to the first tubular receptacle 12, the second and third tubular receptacles are formed of a biodegradable material, preferably paper.

Referring to FIGS. 8 and 9, alternate embodiments of a seed planting container constructed in accordance with the present invention are illustrated generally with the numerals 60 and 62 respectively. With particular reference to FIG. 8, the planting container includes an outer tubular receptacle 64 having a generally elongated shape defining a chamber 66, an open upper end 68, and a tapered lower end 70, the receptacle being formed of a biodegradable material such as paper.

A tubular cone 72 having a tapered lower end 74, an open upper end 76, and an inner cavity 78 for receiving soil 79 and a seed 80 is received in the chamber 66 of the receptacle 64. The tubular cone comprises either frozen water or a frozen mixture of water, nutrients, and fertilizer and includes ballast means 81 for maintaining vertical alignment of the container during air drop, the ballast means being in the form of a split arrow tip 82 and iron shavings or pellets 84 frozen into the tapered lower end 74.

A cap 86 is positioned over the open ends 68 and 76 of the receptacle 64 and the frozen cone 72 and its contents locking them together. The cap has a radially outwardly extending lip 88 overhanging the receptacle which has a braking effect when the receptacle penetrates the ground to a depth which places the lip in contact with the ground. Preferably, the cap is formed from a pressed fertilizer composition and is held in position by the upper end 68 of the receptacle 64 which is bound together by suitable fastening means 89 such as wire or twine 90. In the embodiment of FIG. 8, a wire 92 is frozen into the cone 72 and includes a pair of ends 94 and 96 extending axially upwardly through the cap which, prior to air drop, are bent thereover for additional locking of the cap. Aerodynamic stabilizing means 97, for example a plurality of elongated "feathered" or feather-like members 98, are secured to the cap for maintaining vertical alignment of the container during air drop.

Referring now to FIG. 9, an alternate embodiment 62 of the seed planting container is illustrated having a second tubular cone 100 contained within the first tubular cone 72. The second tubular cone includes a tapered lower end 102, an open upper end 104, and an inner cavity 106 for receiving soil 79 and the seed 80. As hereinbefore described with reference to the additional tubular cones 41 and 42 of the embodiments of FIGS. 5 and 6, the second tubular cone 100 is formed from frozen fluid which may be water or a mixture of water, nutrients, and fertilizer and may be separated from the first tubular cone 72 by a second tubular receptacle 110 formed from a biodegradable material such as paper.

In operation, the desired number of planting containers constructed according to the present invention may be prepared in advance and stored for later use in a cold storage area or freezer. Just prior to planting, either by machine or by air drop, soil 30/79 and a seed 80 or seedling 32 are deposited in the container, which is then closed by either bending the flaps 38 over the open end thereof in the embodiment of FIG. 1, or by installing the pressed fertilizer cap 86 of the alternate container embodiments of FIGS. 8 and 9. The tubular frozen cone or cones cannot possibly injure the seed or seedling by freezing, because the time elapsed between placing the seed in the container and the subsequent planting thereof and melting of the frozen cone will not permit the seed or seedling to freeze.

As illustrated in FIGS. 7 and 10, after implantation of the container, the frozen tubular cone will melt providing water for the seed or seedling and the surrounding soil. Furthermore, as the cone melts, the seed or seedling will sink deeper into the ground in the indentation formed therein by the container, and, as the biodegradable tubular receptacle or receptacles disintegrate, the surrounding soil will fall into the indentation providing additional cover for the seed or seedling. Where the container includes multiple frozen tubular cones, the melting thereof and the deterioration in the soil of the iron ballast released nutrients and fertilizer to the soil to aid the growth of the emplanted seed or seedling. Further, as the respective cones melt, the force of gravity pulling the seed or seedling downward causes water to cascade over the top of the inner biodegradable tubular receptacles separating the frozen cones and down onto the seed or seedling so that, in effect, the container, by its novel construction, has its own selfwatering system.

While the present invention has been described with reference to several embodiments, it will be understood by those skilled in the art that various changes may be made and equivalents may be substituted for elements thereof without departing from the scope of the invention. In addition, many modifications may be made to adapt a particular situation or material to the teachings of the invention without departing from the scope thereof. Therefore, it is intended that the invention not be limited to the particular embodiments disclosed, but that the invention will include all embodiments falling within the scope of the appended claims.

I claim:
1. A planting container comprising:
   at least one tubular cone having a tapered lower end, an open upper end, and an inner cavity for receiving soil and a seed or seedling, the tubular cone being formed by fluid hardened by freezing.

2. The planting container of claim 1 including ballast means for maintaining vertical alignment of the container during air drop, the ballast means being frozen in the tapered lower end of the tubular cone.

3. The planting container of claim 2 wherein the ballast means comprises iron shavings.

4. The planting container of claim 2 wherein the ballast means comprises a split arrow tip.

5. The planting container of claim 1 further including a tubular receptacle having an elongated shape and defining a chamber, the receptacle having an open upper end and a tapered lower end and being formed of a biodegradable material, the tubular cone being received in the chamber.

6. The planting container of claim 5 wherein the biodegradable material comprises paper.

7. The planting container of claim 5 wherein the tubular receptacle includes closure means for closing the open upper end of the receptacle and for locking the tubular cone and the receptacle together.

8. The planting container of claim 7 wherein the closure means comprises a plurality of tabs secured to the open end of the receptacle, the tabs being constructed so as to be folded over the open ends of the receptacle and the cone.

9. The planting container of claim 7 wherein the closure means comprises:
a cap disposed over the open end of the tubular receptacle and having a radially outwardly extending overhanging lip; and
a wire frozen in the tubular cone, the wire extending axially from the open end of the cone and constructed so as to be bent over the cap.

10. The planting container of claim 9 wherein the cap is constructed from biodegradable material.

11. The planting container of claim 10 wherein the biodegradable material comprises paper.

12. The planting container of claim 10 further including aerodynamic stabilizing means for maintaining vertical alignment of the container during air drop.

13. The planting container of claim 12 wherein the aerodynamic stabilizing means comprises a plurality of feathered members secured to the cap.

14. The planting container of claim 7 wherein the frozen fluid comprises water.

15. The planting container of claim 7 wherein the frozen fluid comprises a preselected mixture of water, nutrients, and fertilizer.

16. The planting container of claim 1 further including a second tubular cone received in the inner cavity of the first-mentioned tubular cone, the second tubular cone having a tapered lower end, an open upper end, and an inner cavity for receiving soil and a seed or seedling, the second tubular cone being formed by fluid hardened by freezing.

17. The planting container of claim 16 including ballast means for maintaining vertical alignment of the container during air drop, the ballast means being frozen in the tapered lower end of the first-mentioned tubular cone.

18. The planting container of claim 17 wherein the ballast means comprises iron shavings.

19. The planting container of claim 17 wherein the ballast means comprises a split arrow tip.

20. The planting container of claim 16 further including a first tubular receptacle having an elongated shape and defining a chamber, the receptacle having an open upper end and a tapered lower end and being formed of a biodegradable material, the tubular cones being received in the chamber.

21. The planting container of claim 20 wherein the biodegradable material comprises paper.

22. The planting container of claim 20 wherein the first tubular receptacle includes closure means for closing the upper end of the receptacle and for locking the tubular cones and the receptacle together.

23. The planting container of claim 22 wherein the closure means comprises a plurality of tabs secured to the open end of the first tubular receptacle, the tabs being constructed so as to be folded over the open ends of the first receptacle and the tubular cones.

24. The planting container of claim 22 wherein the closure means comprises:
a cap disposed over the open end of the first tubular receptacle and having a radially outwardly extending overhanging lip; and
a wire frozen in the first-mentioned tubular cone, the wire extending axially from the open end of the cone and constructed so as to be bent over the cap.

25. The planting container of claim 24 wherein the cap is constructed from biodegradable material.

26. The planting container of claim 25 wherein the biodegradable material comprises paper.

27. The planting container of claim 25 further including aerodynamic stabilizing means for maintaining vertical alignment of the container during air drop.

28. The planting container of claim 27 wherein the aerodynamic stabilizing means comprises a plurality of elongated feathered members secured to the cap.

29. The planting container of claim 22 wherein the frozen fluid of the first-mentioned tubular cone comprises water.

30. The planting container of claim 22 wherein the frozen fluid of the first-mentioned tubular cone comprises a preselected mixture of water, nutrients, and fertilizer.

31. The planting container of claim 22 wherein the frozen liquid of the second tubular cone comprises a preselected mixture of water, nutrients, and fertilizer.

32. The planting container of claim 20 further including a second tubular receptacle disposed intermediate the first and second tubular cones, the second tubular receptacle being formed of biodegradable material.

33. The planting container of claim 32 wherein the biodegradable material comprises paper.

34. The planting container of claim 16 further including a third tubular cone received in the inner cavity of the second tubular cone, the third tubular cone having a tapered lower end, an open upper end, and an inner cavity for receiving soil and a seed or seedling, the third tubular cone being formed by fluid hardened by freezing.

35. The planting container of claim 34 including ballast means for maintaining vertical alignment of the container during air drop, the ballast means being frozen in the tapered lower end of the first-mentioned tubular cone.

36. The planting container of claim 35 wherein the ballast means comprises iron shavings.

37. The planting container of claim 35 wherein the ballast means comprises a split arrow tip.

38. The planting container of claim 34 further including a first tubular receptacle having an elongated shape and defining a chamber, the receptacle having an open upper end and a tapered lower end and being formed of a biodegradable material, the tubular cones being received in the chamber.

39. The planting container of claim 38 wherein the biodegradable material comprises paper.

40. The planting container of claim 38 wherein the first tubular receptacle includes closure means for closing the open upper end of the receptacle and for locking the tubular cones and the first receptacle together.

41. The planting container of claim 40 wherein the closure means comprises a plurality of tabs secured to the open end of the first receptacle, the tabs being constructed so as to be folded over the open ends of the first receptacle and the tubular cones.

42. The planting container of claim 40 wherein the closure means comprises:
    a cap disposed over the open end of the third tubular receptacle and having a radially outwardly extending overhanging lip; and
    a wire frozen in the first-mentioned tubular cone, the wire extending axially from the open end of the cone and constructed so as to be bent over the cap.

43. The planting container of claim 42 wherein the cap is constructed from biodegradable material.

44. The planting container of claim 43 wherein the biodegradable material comprises paper.

45. The planting container of claim 42 further including aerodynamic stabilizing means for maintaining vertical alignment of the container during air drop.

46. The planting container of claim 45 wherein the aerodynamic stabilizing means comprises a plurality of elongated feather-like members secured to the cap.

47. The planting container of claim 40 wherein the frozen fluid of the first-mentioned tubular cone comprises water.

48. The planting container of claim 40 wherein the frozen fluid of the first-mentioned tubular cone comprises a preselected mixture of water, nutrients, and fertilizer.

49. The planting container of claim 40 wherein the frozen fluid of the second tubular cone comprises a preselected mixture of water, nutrients, and fertilizer.

50. The planting container of claim 40 wherein the frozen fluid of the third tubular cone comprises a preselected mixture of water, nutrients, and fertilizer.

51. The planting container of claim 38 further including a second tubular receptacle disposed intermediate the first-mentioned and the second tubular cones, the second tubular receptacle being formed of biodegradable material.

52. The planting container of claim 51 wherein the biodegradable material comprises paper.

53. The planting container of claim 51 further including a third tubular receptacle disposed intermediate the second and the third tubular cones, the third tubular receptacle being formed of biodegradable material.

54. The planting container of claim 53 wherein the biodegradable material comprises paper.

* * * * *